US008665785B2

(12) United States Patent  
Beck et al.

(10) Patent No.: US 8,665,785 B2
(45) Date of Patent: Mar. 4, 2014

(54) SYSTEMS AND METHODS FOR ESTABLISHING A TELECOMMUNICATIONS BRIDGE BETWEEN A USER DEVICE AND A NODE

(75) Inventors: Scott Neil Beck, Dallas, TX (US); Marc Andrew Pickren, Rockwall, TX (US); Gerardo Ettore Tonini, Holland, MI (US); David Stephen Toback, Dallas, TX (US)

(73) Assignee: Enversa Companies, LLC, Dallas, TX (US)

( * ) Notice: Subject to any disclaimer, the term of this patent is extended or adjusted under 35 U.S.C. 154(b) by 0 days.

(21) Appl. No.: 12/807,716

(22) Filed: Sep. 13, 2010

(65) Prior Publication Data

US 2011/0080871 A1   Apr. 7, 2011

Related U.S. Application Data

(60) Provisional application No. 61/241,498, filed on Sep. 11, 2009, provisional application No. 61/311,403, filed on Mar. 8, 2010.

(51) Int. Cl.
*H04W 4/00* (2009.01)

(52) U.S. Cl.
USPC .......................................................... 370/328

(58) Field of Classification Search
USPC .......................................................... 370/328
See application file for complete search history.

(56) References Cited

U.S. PATENT DOCUMENTS

| 4,277,651 A | 7/1981 | Fisher, II et al. |
| 4,600,812 A | 7/1986 | Gerlits |
| 4,899,373 A | 2/1990 | Lee et al. |
| 5,095,445 A | 3/1992 | Sekiguchi |
| 5,422,936 A | 6/1995 | Atwell |
| 5,425,079 A | 6/1995 | Noda et al. |
| 5,454,029 A | 9/1995 | Noda |
| 5,661,641 A | 8/1997 | Shindo |
| 5,719,929 A | 2/1998 | Menard |
| 5,752,186 A | 5/1998 | Malackowski et al. |
| 5,768,358 A | 6/1998 | Venier et al. |

(Continued)

FOREIGN PATENT DOCUMENTS

| WO | WO 2006/017269 | 2/2006 |
| WO | WO 2007/124075 | 11/2007 |
| WO | WO 2007/148108 | 12/2007 |
| WO | WO 2008/042205 | 4/2008 |

OTHER PUBLICATIONS

PCT Written Opinion of the International Searching Authority for International Application No. PCT/US10/02476 mailed Nov. 15, 2010.

*Primary Examiner* — Mark Rinehart
*Assistant Examiner* — Christopher R Crompton
(74) *Attorney, Agent, or Firm* — King & Partners, PLC

(57) ABSTRACT

Systems and methods for establishing a telecommunications bridge between a user device and a node are provided herein. In some embodiments a method for establishing a telecommunications bridge between a user device and a node includes receiving a request to establish a telecommunications bridge, the request including information indicative of a user device, and a campaign identifier corresponding to at least one node, comparing the campaign identifier to a campaign database, the campaign database including information indicative of campaign identifiers associated with at least one node, and establishing the telecommunications bridge between a user device and at least one node.

1 Claim, 5 Drawing Sheets

(56) References Cited

U.S. PATENT DOCUMENTS

| | | |
|---|---|---|
| 5,818,701 A | 10/1998 | Shindo |
| 5,867,780 A | 2/1999 | Malackowski et al. |
| 5,898,774 A | 4/1999 | Shindo |
| 5,917,899 A | 6/1999 | Moss et al. |
| 5,974,133 A | 10/1999 | Fleischer, III et al. |
| 6,246,757 B1 | 6/2001 | Cai et al. |
| 6,327,355 B1 | 12/2001 | Britt |
| 6,397,057 B1 | 5/2002 | Malackowski et al. |
| 6,400,818 B1 | 6/2002 | Madoch et al. |
| 6,411,803 B1 | 6/2002 | Malackowski et al. |
| 6,453,161 B1 | 9/2002 | Touati et al. |
| 6,628,774 B2 | 9/2003 | Madoch et al. |
| 6,714,641 B2 | 3/2004 | Kredo et al. |
| 6,775,035 B1 | 8/2004 | Yoshida |
| 6,778,656 B1 * | 8/2004 | Stevens et al. ........... 379/221.01 |
| 6,839,556 B2 | 1/2005 | Malackowski et al. |
| 6,850,605 B2 | 2/2005 | Tiliks et al. |
| 6,925,168 B1 | 8/2005 | Launders et al. |
| 7,020,262 B2 | 3/2006 | Kredo et al. |
| 7,095,832 B2 | 8/2006 | Tiliks et al. |
| 7,181,200 B2 | 2/2007 | Malackowski et al. |
| 7,191,244 B2 | 3/2007 | Jennings et al. |
| 7,310,418 B2 | 12/2007 | Madoch et al. |
| 7,376,584 B1 | 5/2008 | Weixel |
| 7,403,603 B2 | 7/2008 | Tiliks et al. |
| 7,460,873 B2 | 12/2008 | Lovell, Jr. et al. |
| 2001/0005414 A1 | 6/2001 | Madoch et al. |
| 2001/0025309 A1 | 9/2001 | MacLeod Beck et al. |
| 2002/0057783 A1 | 5/2002 | Kredo et al. |
| 2003/0027555 A1 | 2/2003 | Malackowski et al. |
| 2003/0099342 A1 | 5/2003 | Tiliks et al. |
| 2004/0005874 A1 | 1/2004 | Malackowski et al. |
| 2004/0161095 A1 | 8/2004 | Kredo et al. |
| 2005/0025137 A1 | 2/2005 | Madoch et al. |
| 2005/0064821 A1 | 3/2005 | Hedberg et al. |
| 2005/0078813 A1 | 4/2005 | Tiliks et al. |
| 2005/0245242 A1 | 11/2005 | Malackowski et al. |
| 2005/0246413 A1 | 11/2005 | Jennings |
| 2005/0262267 A1 | 11/2005 | Jennings |
| 2006/0002418 A1 | 1/2006 | Jennings |
| 2006/0109960 A1 | 5/2006 | D'Evelyn et al. |
| 2006/0203983 A1 | 9/2006 | Tiliks et al. |
| 2006/0223576 A1 | 10/2006 | Macaluso |
| 2007/0165805 A1 * | 7/2007 | Altberg et al. ........... 379/114.13 |
| 2007/0169149 A1 | 7/2007 | Jennings et al. |
| 2007/0196074 A1 | 8/2007 | Jennings et al. |
| 2007/0198739 A1 | 8/2007 | Jennings et al. |
| 2007/0208805 A1 * | 9/2007 | Rhoads et al. ................ 709/203 |
| 2007/0265006 A1 | 11/2007 | Washok et al. |
| 2007/0286372 A1 * | 12/2007 | DeMent et al. .......... 379/142.01 |
| 2008/0009273 A1 | 1/2008 | Jemison et al. |
| 2008/0014950 A1 | 1/2008 | Madoch et al. |
| 2008/0037729 A1 * | 2/2008 | Mobin et al. ................ 379/88.17 |
| 2008/0066098 A1 | 3/2008 | Witteman et al. |
| 2008/0070558 A1 | 3/2008 | Lovell |
| 2008/0126113 A1 | 5/2008 | Manning et al. |
| 2008/0194260 A1 * | 8/2008 | Altberg et al. ............. 455/435.1 |
| 2008/0200153 A1 | 8/2008 | Fitzpatrick et al. |
| 2008/0215428 A1 | 9/2008 | Ramer et al. |
| 2008/0232572 A1 | 9/2008 | Macaluso |
| 2008/0243616 A1 | 10/2008 | Macaluso |
| 2008/0249833 A1 | 10/2008 | Ali et al. |
| 2008/0262929 A1 | 10/2008 | Behr |
| 2008/0270238 A1 | 10/2008 | Zweben et al. |
| 2009/0005438 A1 | 1/2009 | Cheng et al. |
| 2009/0029725 A1 | 1/2009 | Kindberg |
| 2009/0047924 A1 | 2/2009 | Ray et al. |
| 2009/0069037 A1 | 3/2009 | Gan et al. |
| 2009/0086932 A1 | 4/2009 | Ray |
| 2009/0097474 A1 | 4/2009 | Ray et al. |
| 2009/0150215 A1 | 6/2009 | Kalb et al. |
| 2010/0226287 A1 * | 9/2010 | Horvath et al. ................ 370/260 |
| 2011/0028137 A1 * | 2/2011 | Moshrefi et al. ............. 455/418 |

* cited by examiner

SYSTEMS AND METHODS FOR ESTABLISHING A TELECOMMUNICATIONS BRIDGE BETWEEN A USER DEVICE AND A NODE

CROSS-REFERENCE TO RELATED APPLICATION(S)

This application claims the benefit of U.S. Provisional Application Ser. No. 61/241,498, entitled "VANITY DIALING CODES AND ASSOCIATED REGISTRY AND METHODS UTILIZING THE SAME," filed Sep. 11, 2009 and U.S. Provisional Application Ser. No. 61/311,403, entitled "VANITY DIALING CODES AND ASSOCIATED REGISTRY AND METHODS UTILIZING THE SAME," filed Mar. 8, 2010—all of which are hereby incorporated herein by reference in their entirety, including all references cited therein.

BACKGROUND OF THE INVENTION

1. Field of the Invention

The present invention relates in general to systems and methods for establishing a telecommunications bridge and more particularly, but not by way of limitation, to systems and methods that establishing a telecommunications bridge between a user device and a service provider by implementing vanity dialing code registries comprising, among other things, multi-character vanity dialing codes which are translated via a database to connect a user device to a node via an internet protocol (IP) address, web site, toll free number, voice over internet protocol (VoIP) address, wireless automatic number identification (ANI), wire line ANI, interactive voice response (IVR) application, etcetera.

2. Background Art

Systems and methods for establishing telecommunications bridges between user devices and nodes are well known in the art. Generally speaking, to establish a telecommunications bridge between a user device (e.g., a cellular telephone, a wireline telephone, and the like) and a node such as a service provider, the end user enters either a seven or ten digit telephone number corresponding to the service provider into the user device. Utilizing the phone number entered into a telecommunications device, a telecommunications system establishes an end-to-end telecommunications channel between the user device and the node. It will be understood that in most instance, service providers establish ten digit toll free phone numbers that may be utilized to connect end users to a customer service department the service provider.

While these systems and methods exist, they suffer from numerous drawbacks including, but not limited to, the need for customers to remember and correctly enter the seven or ten digit telephone number corresponding to the service provider.

It is therefore an object of the present invention, among others, to provide systems and methods for establishing a telecommunications bridge between a user device and a node, and in some embodiments systems and methods that establish a telecommunications bridge between an end user and a service provider by processing vanity dialing codes utilizing a vanity dialing code database.

These and other objects of the present invention will become apparent in light of the present specification, claims, and drawings.

SUMMARY OF THE INVENTION

In one embodiment, the present invention is directed to a method for establishing a telecommunications bridge between a node and a user device, the method including: (a) receiving a request to establish a telecommunications bridge, the request including information indicative of a user device, and a campaign identifier corresponding to at least one node; (b) comparing the campaign identifier to a campaign database, the campaign database including information indicative of campaign identifiers associated with at least one node; and (c) establishing the telecommunications bridge between a user device and at least one node via a campaign management module based upon at least a portion of the information included in the request In another embodiment, information indicative of the user device includes at least one of an IP address, a wireless ANI, SIM card data, temporal data, location data, user profile information, and carrier information.

In an additional embodiment, the campaign identifier includes any of a bar code, a URI, a URL, a vanity dialing code, an image (a stored image file or live capture from the end user device camera), an SMS message, an audio recording (pre-recorded audio file or live voice recording from the end device microphone where available), a video recording (pre-recorded video file or live video recording from the end user device video recorder where available), input provided by means of a touch-screen interface or motion detection sensor (e.g. gyroscopic motion detection), end user device Global Positioning System (GPS) data, end-user device compass coordinates.

In yet another embodiment, if the campaign identifier includes a vanity dialing code, the vanity dialing code includes a multi-number character string associated with at least one of one or more informational campaigns and a node.

In accordance with the present invention, the bridge is adapted to utilize one or more communication protocols including any of an end-to-end telecommunications voice channel, telecommunications signaling channel, TCP/IP (Transmission Control Protocol/Internet Protocol), POP3 (Post Office Protocol 3), SMTP (Simple Mail Transfer Protocol), FTP (File Transfer Protocol), SMS (Short Message System), IP-based network socket, or combinations thereof.

In another embodiment, receiving a request includes: (i) selecting a toll free phone number based upon a location of the user device included in the request or other data retrieved from the user device such as user profile information; and (ii) establishing an end-to-end telecommunications channel between the user device and a campaign management module utilizing the selected toll free phone number, the end-to-end telecommunications channel including a signaling band having at least a portion of the information included in the request.

In one additional embodiment, establishing the bridge includes: (i) locating one or more servicer providers corresponding to the campaign identifier by searching a campaign database; and (ii) establishing an end-to-end telecommunications channel between the located node and the user device.

In accordance with the present invention, the method further comprises delivering an error message to the user device when received the campaign identifier is not included in the campaign database.

In yet another embodiment, the end-to-end telecommunications channel between the user device and the node is adapted to be held open after the node has terminated communication to allow one or more informational campaigns to be delivered to the user device.

In one embodiment, the one or more informational campaigns includes any of an advertisement, a video, a discount, an audio message, a public service announcement, an emergency alert message, an SMS message, a location, directions, a menu, an email message, a ringtone, a coupon, a hyperlink, a web page, an interactive voice response (IVR) application, an information collection system, a sweepstakes or raffle entry, a program enrollment, form, questionnaire, or combinations thereof.

In another aspect of the present invention, the temporal data associated with the user device is utilized to determine the one or more informational campaigns selected for delivery to the user device.

In one other embodiment, the location data of the user device, user speech input, input via DTMF (Dual-Tone Multi-Frequency) tones, or combination thereof are utilized to determine the one or more informational campaigns selected for delivery to the user device.

In one additional embodiment, the method further comprises associating at least one of an informational campaign and a node with one or more campaign identifiers.

In one embodiment, the present invention is directed to a system for establishing a telecommunications bridge between a node and a user device, the system including (a) a campaign management module that includes: (i) an input module adapted to receive a request to establish the telecommunications bridge, the request including information indicative of a user device, and a campaign identifier corresponding to at least one node; and (ii) a communications module adapted to establish a bridge between a user device and at least one node based upon at least a portion of the information included in the request.

In another embodiment, the campaign management module includes an analysis module adapted to compare the campaign identifier to a campaign database, the campaign database including information indicative of campaign identifiers associated with at least one of one or more informational campaigns and information indicative of at least one node.

In an additional embodiment, the request to establish a telecommunications bridge is received by at least a portion of a core network that is adapted to: (i) evaluate the campaign identifier included in a request; (ii) select a toll free phone number; and (iii) establish an end-to-end telecommunications channel between the user device and a campaign management module utilizing the selected toll free phone number, the end-to-end telecommunications channel including a signaling band having at least a portion of the information included in the request.

In yet another embodiment, the campaign identifier includes any of information indicative of a bar code, a URI (Uniform Resource Indicator), a URL (Uniform Resource Locator), a vanity dialing code, an image (a stored image file or live capture from the end user device camera), an SMS message, an audio recording (pre-recorded audio file or live voice recording from the end device microphone where available), a video recording (pre-recorded video file or live video recording from the end user device video recorder where available), input provided by means of a touch-screen interface or motion detection sensor (e.g. gyroscopic motion detection), end user device Global Positioning System (GPS) data, end-user device compass coordinates In another aspect of the present invention, the request further includes information indicative of at least one of temporal data, location data, and carrier information that affect the selection of the one or more informational campaigns delivered to the user device.

In another embodiment, if the campaign identifier includes a vanity dialing code, the vanity dialing code includes a multi-number character string associated with one or more informational campaigns.

In yet another embodiment, the communications module is adapted to utilize one or more communication protocols including any of an end-to-end telecommunications channel, TCP/IP, POP3, SMTP, FTP, SMS, IP-based network socket, or combinations thereof.

In one embodiment, the communications module is adapted to deliver an error message to the user device when received the campaign identifier is not included in a campaign identifier database.

In an additional embodiment, the communications module is adapted to establish an end-to-end telecommunications channel between the user device and the node that is configured to be held open after the node has terminated communication to allow one or more informational campaigns to be delivered to the user device.

In an additional embodiment, the one or more informational campaigns includes any of an advertisement, a video, a discount, an audio message, an SMS message, a location, directions, a menu, an email message, a ringtone, a coupon, a hyperlink, a web page, an interactive voice response (IVR) application, an information collection system, a sweepstakes or raffle entry, a program enrollment, form, questionnaire, or combinations thereof.

In yet another embodiment, the system further comprises a campaign database module adapted to associate at least one of an informational campaign and a node with one or more campaign identifiers.

BRIEF DESCRIPTION OF THE DRAWINGS

Certain embodiments of the present invention are illustrated by the accompanying figures. It will be understood that the figures are not necessarily to scale and that details not necessary for an understanding of the invention or that render other details difficult to perceive may be omitted. It will be understood that the invention is not necessarily limited to the particular embodiments illustrated herein.

DETAILED DESCRIPTION OF EXEMPLARY EMBODIMENTS

Figure 1A:
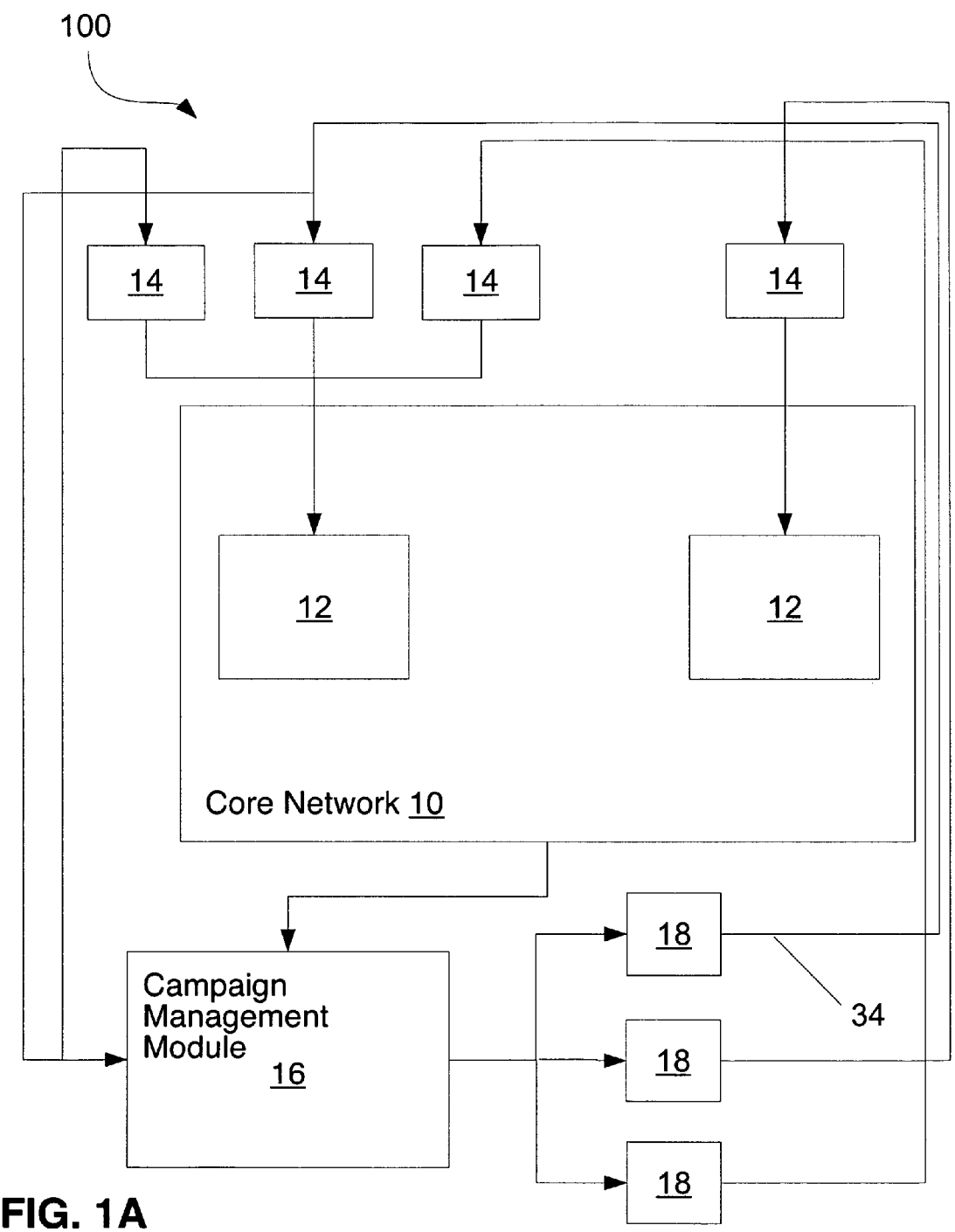
FIG. 1A is a block diagram of an exemplary architecture for establishing a telecommunications bridge in accordance with various embodiments of the present invention.

While this invention is susceptible of embodiment in many different forms, there is shown in the drawings and will herein be described in detail several specific embodiments with the understanding that the present disclosure is to be considered as an exemplification of the principles of the invention and is not intended to limit the invention to the embodiments illustrated.

It will be understood that like or analogous elements and/or components, referred to herein, may be identified throughout the drawings with like reference characters.

Figure 1B:
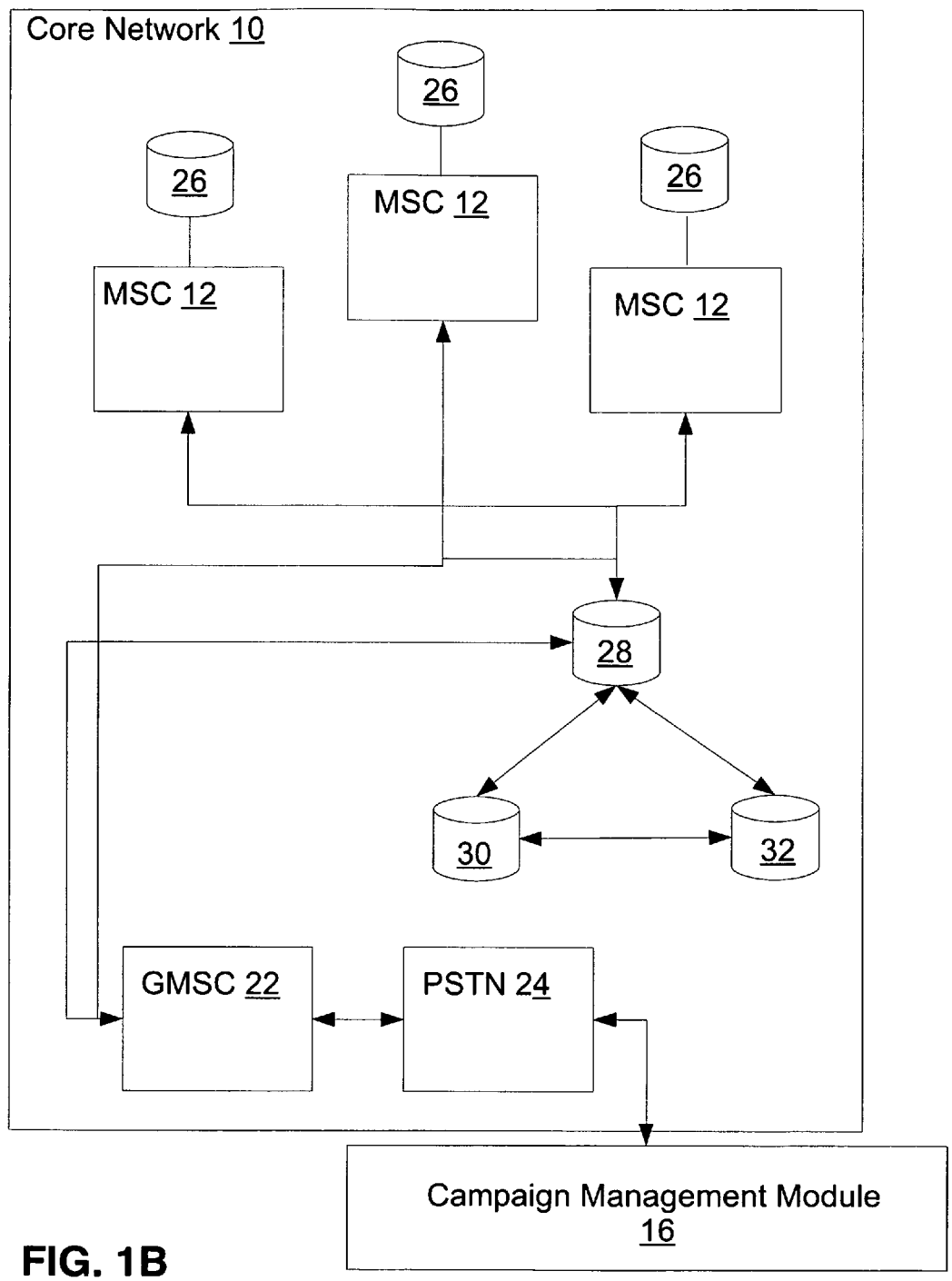
FIG. 1B is a block diagram of a core network adapted to connect user devices to a campaign management module.
Figure 1C:
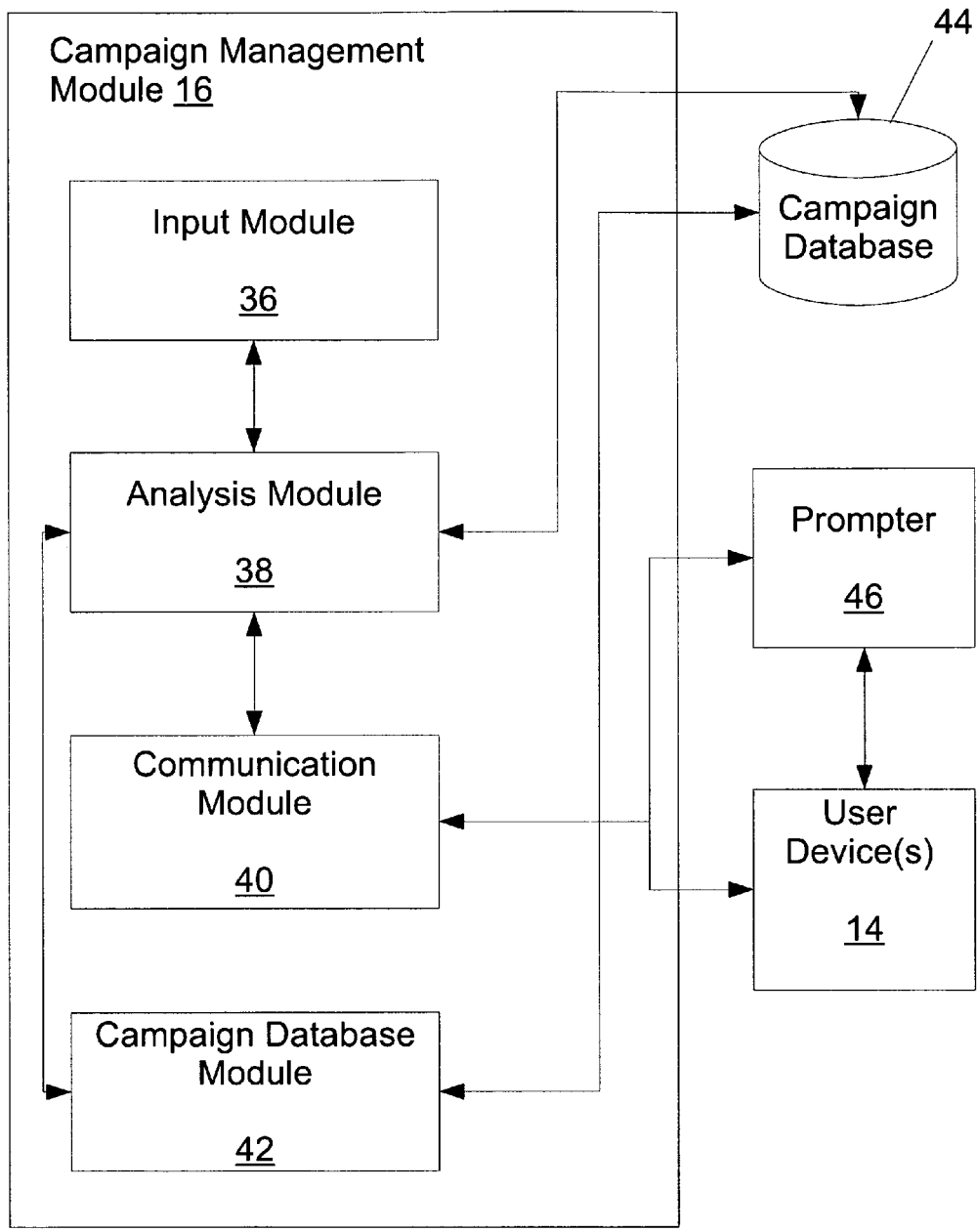
FIG. 1C is a block diagram of a campaign management module.

Referring now to the drawings and more particularly, to FIGS. 1A-C collectively, an exemplary architecture 100 that may be utilized to implement embodiments of the present invention is shown. In some embodiments, architecture 100 may be broadly described as including GSM (global system for mobile communications) core network 10 having a plurality of mobile switching centers 12 adapted to facilitate communication between one or more user devices 14 and campaign management module 16. It will be understood that campaign management module 16 may be adapted to establish a telecommunications bridge between user devices 14 and one or more node 18. It will be understood that the term node 18 includes for example, service providers (e.g., entities that provide goods, products, information, or any combination thereof), merchants, other user devices, government entities—just to name a few.

According to some embodiments, user device 14 may include any number of telecommunications devices capable of utilizing a telecommunications bridge between a node and an end user such as cellular telephones, wireline phones, personal digital assistance, gaming platform, smart camera, public data entry terminal, automated teller machine, computing systems, and the like.

According to some embodiments, core network 10 includes at least one of a global system for mobile communications (GSM network), a code division multiple access network (CDMA "Code Division Multiple Access" network), or other mobile phone standard networks such as EDGE (Enhanced Data Rates for GSM Evolution), UMTS/UTRA (Universal Mobile Telecommunications System), HSDPA (High-Speed Downlink Packet Access), and the like. More specifically, in some embodiments, core network 10 may include mobile switching centers 12 that are operatively coupled to gateway mobile switching center 22, which is in turn operatively coupled to public switched telephone network 24 (PSTN).

Mobile switching centers 12 are the primary nodes of core network 10 and may route communications such as cellular telephone calls, SMS (often handled by an SMSC "Short Message Service Center"), and the like received from user devices 14. It will be understood that mobile switching centers 12 are configured to establish end-to-end communications between, for example, two or more user devices 14, user devices 14 and service providers, and the like. Mobile switching centers 12 may also be adapted to communicate with visitor location register 26, which includes information indicative of one or more user devices 14 (e.g., an LAI or Local Area Identity) in communication with one or more mobile switching centers 12. Although not shown, mobile switching center 12 may also include a base transceiver adapted to facilitate signaling between user devices 14 and core network 10.

Gateway mobile switching center 22 is a particular type of MSC that may be adapted to determine the location of mobile switching centers 12 currently communicating with user device 14. Gateway mobile switching center 22 may be adapted to communicate with public switched telephone network 24. Public switched telephone network 24, also known as the plain old telephone service, is a global circuit-switched telephone network adapted to allow any type of telecommunications device (e.g., mobile phone, fixed line telephones, and the like) to communicate with any other telecommunications device, regardless of the telecommunications medium utilized by the telecommunications device, such as fiber optic cables, microwave transmission links, cellular networks, communications satellites, undersea telephone cables, and the like. It will be understood that at least a portion of public switched telephone network 24 may be cloud based and reside on one or more switching servers (not shown) located remotely from core network 10.

Both mobile switching centers 12 and gateway mobile switching center 22 are operatively connected to home location register 28 or HLR that may include information indicative of all user devices 14 having access to core network 10. Information indicative of user device 14 includes SIM card (Subscriber Identity Module) information for each user device 14. SIM card information may be authenticated by authentication center 30 or AUC. Additionally, authentication center 30 may be operatively connected to equipment identity register 32 that includes information indicative of the hardware of user device 14.

Additionally, mobile switching centers 12 may be modified to include translation tables that include information indicative of routing information for each of the campaign identifiers. The routing information instructs one or more components of core network 10 as to how campaign identifiers received from user devices 14 should be handled by public switched telephone network 24. For example, each campaign identifier may be associated with one or more telephone numbers or VoIP addresses that allow user devices 14 to be operatively connected to campaign management module 16.

By way of non-limiting example, according to some embodiments, the campaign identifiers may include VDCs or (Vanity Dialing Codes) that include numerical character strings of varying length. It will be understood that the length of the VDCs may vary depending on the particular network handing the request. That is, the VDC may include any number of characters so long as the VDC character string does not conflict with the default dialing schemes of the telecommunications network processing the requests. It will also be understood that the VDC may also include additional characters such as #, *, & and the like. Campaign identifiers may also include any of information indicative of a bar code, a URI, a URL, a vanity dialing code or VDC, an image (a stored image file or live capture from the end user device camera), an SIMS message, an audio recording (pre-recorded audio file or live voice recording from the end device microphone where available), a video recording (pre-recorded video file or live video recording from the end user device video recorder where available), input provided by means of a touch-screen interface or motion detection sensor (e.g. gyroscopic motion detection), end user device Global Positioning System (GPS) data, end-user device compass coordinates, that would be known to one of ordinary skill in the art with the present disclosure before them. For the sake of brevity, only a discussion of the establishment and use of short dialing codes also known as VDCs will be discussed in greater detail infra.

In some embodiments, a request to establish a telecommunications bridge includes VDCs received from user devices 14 via one or more mobile switching centers 12. For example, an end user may enter an VDC such as "TIX" corresponding to a numerical character string of for example, "849," "#849," "849," and the like. In this example, an VDC of "849" corresponds to a particular company that provides ticketing for events. The VDC may be evaluated by at least one of mobile switching centers 12 or gateway mobile switching center 22 and utilized to operatively connect user devices 14 to campaign management module 16 via public switched telephone network 24. More specifically, mobile switching centers 12 or gateway mobile switching center 22 may evaluate the VDC of "849" and append the same to a toll free phone number as an out-of-band signal. The toll free number is then routed to campaign management module 16 via public switched telephone network 24**.

In some embodiments, the toll free number may be chosen based upon the location of user device 14 that is then communicated to campaign management module 16. It will be understood that the toll free numbers may be cross-linked to particular VDCs within the translation tables associated with visitor location registers 26 and home location registers 28.

Similarly to the campaign identifier, additional information may be appended to the toll free phone number as an out-of-band signal such as temporal data indicative of the time a request was received by mobile switching center 12, carrier information corresponding to mobile carrier associated with user device 14, hardware configurations of user device 14 as determined by equipment identity register 32, and the like. The additional information may be utilized by campaign management module 16 to affect the selection of informational campaigns provided to user devices 14 in addition to establishing the telecommunications bridge between user device 14 and a node 18.

In other embodiments, rather than an end-to-end telecommunications channel, core network 10 may be adapted to utilize additional types of communication protocols such as TCP/IP utilizing IP addresses or domain names, POP, FTP, SMTP, SIMS, and the like.

Campaign management module 16 may be adapted to receive the routed requests via public switched telephone network 24 and evaluate the received information to establish bridge 34 operatively connecting user device 14 to one or more nodes 18 such as service providers, an IP address, a VoIP channel, an interactive voice response or IVY application, and the like. In additional embodiments, bridge 34 may represent any number of communication mediums that utilize any number of communication protocols (e.g., TCP/IP, SIMS, and the like) that would be known to one of ordinary skill in the art with the present disclosure before them. Moreover, bridge 34 may also be adapted to create and maintain multiple channels of communication simultaneously. For example, bridge 34 may be utilized for the establishment of communications between user devices 14 and service providers.

In some embodiments, campaign management module 16 may include input module 36, analysis module 38, communications module 40, and campaign database module 42. It is noteworthy that campaign management module 16 may be composed of more or fewer modules and engines (or combinations of the same) and still fall within the scope of the present technology. Additionally, it will be understood that the constituent modules described herein may be executed by a processor of a computing system to effectuate respective functionalities attributed thereto.

In some embodiments, campaign management module 16 may function as a telecommunications switch capable of routing toll free phone numbers received from public switched telephone network 24 via input module 36 to an appropriate node 18.

In some embodiments, communications module 40 of campaign management module 16 may establish bridge 34 that in some embodiments includes an end-to-end telecommunications channel between user device 14 and node 18. Communications module 40 may be adapted to hold open an end-to-end telecommunications channel for a predetermined amount of time after node 18 has terminated communication with user device 14 so that campaign management module 16 may deliver informational campaigns to user device 14. It will be understood that the selected informational campaigns may correspond to one or more goods or services provided by service provider, for example, additional advertisements available from service provider, or an affiliated service provider.

Non-limiting examples of informational campaigns include at least one of an advertisement, a video, a discount, an audio message, an SIMS message, a location, directions, a menu, an email message, a ringtone, a coupon, a hyperlink, a web page, interactive voice response (IVY) application, an information collection system, a sweepstakes or raffle entry, a program enrollment, form, questionnaire, or combinations thereof.

Generally speaking, analysis module 38 of campaign management module 16 is adapted to compare information received by input module 36, such as a VDC appended to the toll free phone number, to campaign database 44 to determine one or more informational campaigns that may be provided to user devices 14. Analysis module 38 may then select one or more of the informational campaigns based upon the campaign identifier (e.g., VDC) and deliver the selected informational campaigns to user devices 14 during or after the establishment of communications between user device 14 and node 18 via communications module 40.

Returning back to the example, input module 36 of campaign management module 16 receives a campaign identifier, such as a VDC of "849," appended to a toll free phone number as an out-of-band signal. Analysis module 38 evaluates the VDC of "849" appended to the toll free phone number and compares the VDC of "849" against campaign database 44 and locates information indicative of a service provider such as a customer service phone number. It will be understood that the information indicative of the service provider may include, a marketing telephone number, a sales telephone number, a technical support telephone number, any other telephone number corresponding to a service provider. During or after communications module 40 establishes an end-to-end telecommunications channel between the customer service phone number of the ticketing company and user device 14, communications module 40 may communicate the coupon to user device 14 on an additional communications protocol, such as SMS (text message). As such, the end user is able to utilize the coupon in the instant transaction conducted during the telephone call between the end user utilizing user device 14 and the service provider.

It will be understood that analysis module 38 may also utilize additional information indicative of user device 14 to determine the selection of an informational campaign from campaign database 44. For example, if the service provider maintains several informational campaigns that vary depending on the day of the week, analysis module 38 may utilize temporal data indicative of when user device 14 initiated communications with core network 10. The temporal data may be included as an out-of-band signal appended to the end-to-end telecommunications channel established between public switched telephone network 24 and campaign management module 16. It will be understood that one or more end users may create user profiles that contain personal information (e.g., preferences) that may be utilized by the campaign management module 16 to determine one or more informational campaigns to deliver to user device 14.

It will be understood that in some embodiments, rather than an end-to-end telecommunications channel such as a traditional wireless or wireline connection, communications module 40 is adapted to utilize a voice over Internet protocol (VoIP) connection via an Internet protocol address, a wireless ANI, and the like, to connect user device 14 to node 18.

Alternatively, if analysis module 38 is unable to locate a node 18 corresponding to a received campaign identifier, analysis module 38 may cause prompter 46 to request input of a phone number corresponding to node 18 with which the end user desires to establish an end-to-end telecommunications channel. Moreover, if no node 18 corresponds to the input, an error message may be communicated to user device 14 before campaign management module 16 clears the telecommunications channel. Prompter 46 may be adapted to request information indicative of an alternative informational campaign from the end user, which may be delivered user device 14.

According to other embodiments, a database may be used by campaign database module 42 to notify service providers of various data relative to successful/unsuccessful outcomes relative to the delivery of an informational campaign. The data collected from and provided to service providers may include records of specific instances when end users utilized informational campaigns, such as coupons.

Additionally, campaign management module 16 may record an aggregate number of times coupons were utilized by end users. The data collected may be organized into logs that can be stored in a service provider database and accessed by the service providers. For example, service providers may communicate information indicative of a successful use of a coupon that may include information indicative of user device 14 associated with the successful use of the coupon.

Additionally, campaign database module 42 may be adapted to establish and maintain campaign database 44 by communicating with nodes 18 such as service providers, receiving input indicative of a particular campaign identifier that service provider desires to associate with a customer service center. Campaign database module 42 may also be adapted to associate the campaign identifier with one or more informational campaigns, which are both cross-linked to a service provider. The associated campaign identifiers are stored in a campaign database that resides on a server or within a server cloud (not shown). It will be understood that a service provider may purchase or lease the selected campaign identifier for a predetermined amount of time such as one year to five years.

In some embodiments, campaign management module 16 is adapted to communicate with a third party vendor (not shown) that delivers one or more informational campaigns to user devices 14 rather than campaign management module 16 or node 18. In particular, campaign management module 16 receives requests to establish a telecommunications bridge as described above and communicates at least a portion of the request to the third party vendor who analyzes the request and delivers one or more informational campaigns to user devices 14 in addition to establishing the telecommunications bridge between user device 14 and a service provider.

Figure 2:
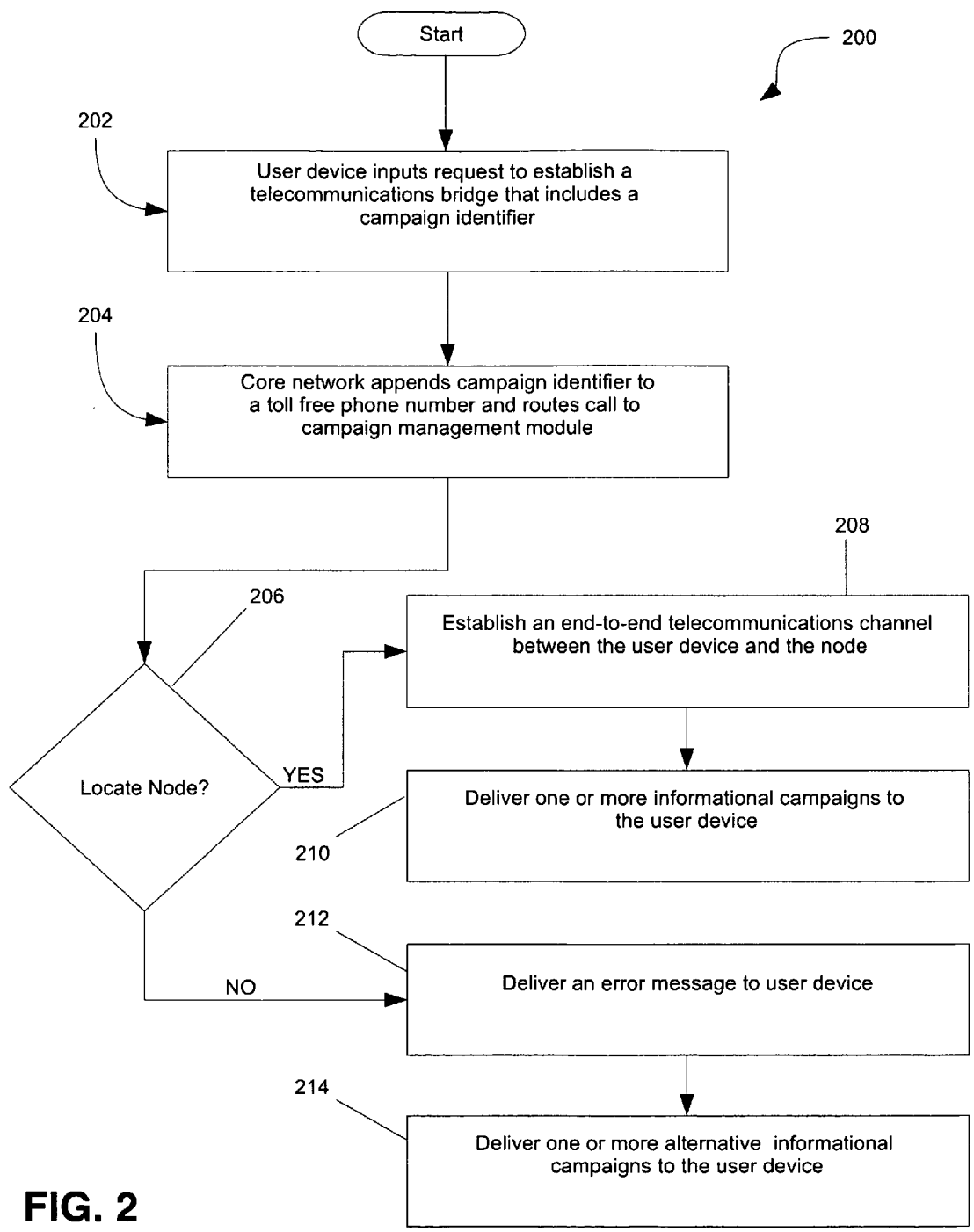
FIG. 2 is a flowchart of an exemplary method for establishing a telecommunications bridge between a user device and a node.

Referring now to FIG. 2, method 200 for establishing a telecommunications bridge between a user device and a node is shown as a flow diagram having a plurality of steps.

Method 200 begins with step 202 of a user device broadcasting a request to establish a telecommunications bridge between the user device and at least one node. One or more of the mobile switching centers of the core network then receives the request from the user device. It will be understood that the request to establish a telecommunications bridge may include information indicative of the user device (SIM card data) and a campaign identifier. It will be understood that the node preferably establishes a campaign identifier according to the above described methods prior to step 202.

Step 204 includes the core network mapping the campaign identifier to a toll free telephone number that is selected based in part upon the location of the mobile switching center that received the request from the user device. The campaign identifier may be mapped to the toll free telephone number by the core network as an out-of-band signal that is communicated to a campaign management module via a public switched telephone network of the core network.

Step 206 includes the campaign management module selecting information indicative of one or more nodes by evaluating the campaign identifier mapped to the toll free telephone number in step 204. The campaign management module is adapted to compare the campaign identifier to a campaign database operatively associated with the campaign management module to select one or more nodes with which to establish a telecommunications bridge. It will be understood that the campaign management module may also utilize other information indicative of the user device such as location data, temporal data, and carrier data—just to name a few.

If the campaign management module locates information indicative of at least one node, the campaign management module may establish a bridge between the user device and the node via the campaign management module. More specifically, the campaign management module may establish an end-to-end telecommunications bridge between the user device and the node in step 208. Additionally, the campaign management module may deliver an informational campaign to the user device during or after the establishment of the end-to-end telecommunications channel between the user device and the node in step 210 by holding the telecommunications bridge open after telecommunications between node 18 and user device 14 have terminated. It will be understood that delivery of an informational campaign may occur in tandem with the establishment of an end-to-end telecommunications bridge between the user device and the node in step 208.

If the analysis module is unable to locate information indicative of a node corresponding to the campaign identifier or a node with which to establish an end-to-end telecommunications bridge, the communications module may deliver an error message to the user device in step 212. In addition to delivering an error message, the analysis module is adapted to request and receive input via the user device indicative of an alternative informational campaign to deliver to the user device in step 214. It will be understood that the request may be evaluated by the analysis module according to a user profile previously established by the end user that may include preferences related to the end user.

Once the end-to-end telecommunications channel between the user device and the node has been cleared the method 200 terminates.

Figure 3:
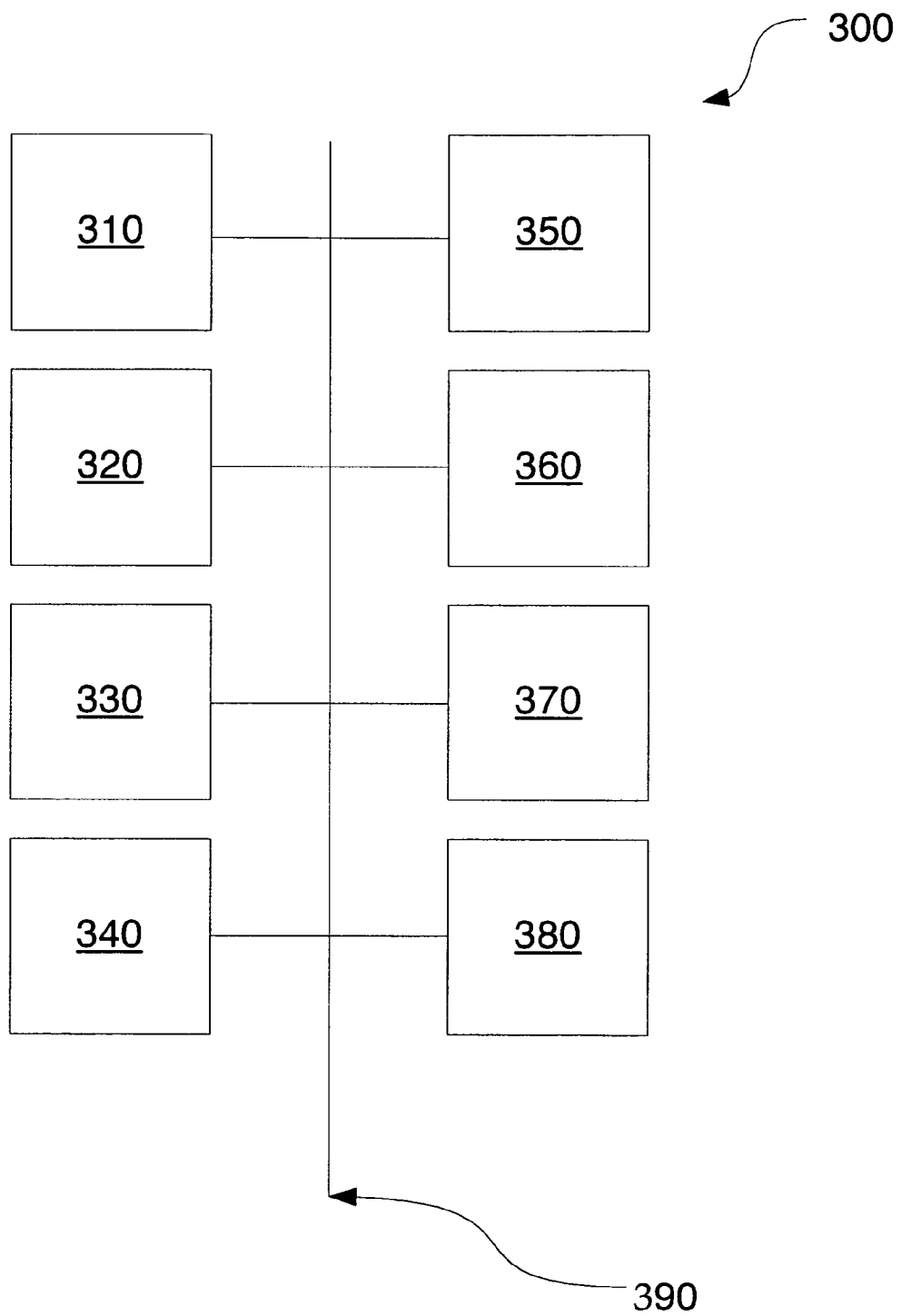
FIG. 3 is a block diagram of an exemplary computing system for executing one or more functions of a method for establishing a telecommunications bridge between a user device and a node in accordance with various embodiments of the present invention.

FIG. 3 illustrates an exemplary computing system 300 that may be used to implement various portions of the present invention. Computing system 300 of FIG. 3 may be implemented in the context of user devices 14, campaign management module 16, node 18, and the like. The computing system 300 of FIG. 3 includes one or more processors 310 and memory 320. Main memory 320 stores, in part, instructions and data for execution by processor 310. Main memory 320 can store the executable code when computing system 300 is in operation. Computing system 300 of FIG. 3 may further include mass storage device 330, portable storage medium drive(s) 340, output devices 350, user input devices 360, graphics display 370, and other peripheral devices 380.

The components shown in FIG. 3 are depicted as being connected via single bus 390. The components may be connected through one or more data transport means. Processor unit 310 and main memory 320 may be connected via a local microprocessor bus, and mass storage device 330, peripheral device(s) 380, portable storage medium drive 340, and graphics display 370 may be connected via one or more input/output (I/O) buses.

Mass storage device 330, which may be implemented with a magnetic disk drive or an optical disk drive, is a non-volatile storage device for storing data and instructions for use by processor 310. Mass storage device 330 can store the system software for implementing embodiments of the present invention for purposes of loading that software into main memory 320.

Portable storage medium drive 340 operates in conjunction with a portable non-volatile storage medium, such as a floppy disk, compact disk or Digital video disc, to input and output data and code to and from computing system 300 of FIG. 3. The system software for implementing embodiments of the present invention may be stored on such a portable medium and input into computing system 300 via portable storage medium drive 340.

Use input devices 360 provide a portion of a user interface. User input devices 360 may include an alphanumeric keypad, such as a keyboard, for inputting alphanumeric and other information, or a pointing device, such as a mouse, a trackball, stylus, or cursor direction keys. Additionally, computing system 300 as shown in FIG. 3 includes output devices 350. Suitable output devices include speakers, printers, network interfaces, and monitors.

Graphics display 370 may include a liquid crystal display (LCD) or other suitable display device. Graphics display 370 receives textual and graphical information, and processes the information for output to the display device.

Peripheral devices 380 may include any type of computer support device to add additional functionality to the computer system. Peripheral device(s) 380 may include a modem or a router.

The components contained in computing system 300 of FIG. 3 are those typically found in computer systems that may be suitable for use with embodiments of the present invention and are intended to represent a broad category of such computer components that are well known in the art. Thus, computing system 300 of FIG. 3 can be a personal computer, hand held computing system, telephone, automated bank teller machine (ATM), mobile computing system, workstation, server, minicomputer, mainframe computer, or any other computing system. The computer can also include different bus configurations, networked platforms, multi-processor platforms, etc. Various operating systems can be used including UNIX, Linux, Windows, Macintosh OS, Palm OS, iOs, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the invention. Those skilled in the art are familiar with instructions, processor(s), and storage media.

It is noteworthy that any hardware platform suitable for performing the processing described herein is suitable for use with the invention. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASHEPROM, any other memory chip or cartridge, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

While the present invention has been described in connection with a series of preferred embodiments, these descriptions are not intended to limit the scope of the invention to the particular forms set forth herein. It will be further understood that the methods of the invention are not necessarily limited to the discrete steps or the order of the steps described. To the contrary, the present descriptions are intended to cover such alternatives, modifications, and equivalents as may be included within the spirit and scope of the invention as defined by the appended claims and otherwise appreciated by one of ordinary skill in the art.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A method for establishing a telecommunications bridge between a node and a user device, the method comprising the steps of:

receiving a request to establish a telecommunications bridge, the request including information indicative of a user device, and a campaign identifier corresponding to at least one node;

comparing the campaign identifier to a campaign database, the campaign database including information indicative of campaign identifiers associated with at least one node;

establishing the telecommunications bridge between a user device and at least one node via a campaign management module based upon at least a portion of the information included in the request;

wherein information indicative of the user device includes at least one of an Internet protocol address, a wireless automatic number identification, subscriber identity module card data, temporal data, location data, and carrier information;

wherein the campaign identifier includes a vanity dialing code, the vanity dialing code includes a multi-character string associated with at least one node;

wherein the telecommunications bridge is adapted to utilize one or more communication protocols including any of an end-to-end telecommunications voice channel, telecommunications signaling channel, transmission control protocol/Internet protocol, post office protocol 3, simple mail transfer protocol, file transfer protocol, short message service, Internet protocol-based network socket, or combinations thereof;

wherein receiving the request includes selecting a toll free phone number based upon, information indicative of the user device included in the request; and establishing an end-to-end telecommunications channel between the user device and a campaign management module utilizing the selected toll free phone number, the end-to-end telecommunications channel including a signaling band having at least a portion of the information included in the request;

delivering an error message to the user device when the campaign identifier is not included in the campaign database;

wherein the end-to-end telecommunications channel between user device and the node is adapted to be held open after the node has terminated communication to allow one or more informational campaigns to be delivered to the user device;

wherein the one or more informational campaigns includes any of an advertisement, a video, a discount, an audio message, a public service announcement, an emergency alert message, a short message service message, a location, directions, a menu, an email message, a ringtone, a coupon, a hyperlink, a web page, an interactive voice response application, an information collection system, a sweepstakes or raffle entry, a program enrollment form, questionnaire, or combinations thereof;

wherein the temporal data associated with the user device is utilized to determine one or more informational campaigns selected for delivery to the user device;

wherein the location data of the user device is utilized to determine one or more informational campaigns selected for delivery to the user device; and associating at least one node with one or more campaign identifiers.

\* \* \* \* \*